(12) United States Patent
Cherny et al.

(10) Patent No.: US 12,013,928 B2
(45) Date of Patent: *Jun. 18, 2024

(54) CREDENTIAL SAFETY MANAGEMENT FOR SOFTWARE CONTAINERS

(71) Applicant: Aqua Security Software, Ltd., Ramat Gan (IL)

(72) Inventors: Michael Cherny, Ramat Gan (IL); Sagie Dulce, Tel Aviv (IL)

(73) Assignee: Aqua Security Software, Ltd., Ramat Gan (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/076,605

(22) Filed: Dec. 7, 2022

(65) Prior Publication Data

US 2023/0095747 A1    Mar. 30, 2023

Related U.S. Application Data

(63) Continuation of application No. 17/214,214, filed on Mar. 26, 2021, now Pat. No. 11,580,216, which is a continuation of application No. 16/128,662, filed on Sep. 12, 2018, now Pat. No. 11,017,074.

(51) Int. Cl.
  *G06F 21/45*    (2013.01)
  *G06F 21/60*    (2013.01)

(52) U.S. Cl.
  CPC ............ *G06F 21/45* (2013.01); *G06F 21/604* (2013.01)

(58) Field of Classification Search
  CPC .............................. G06F 21/45; G06F 21/604
  See application file for complete search history.

(56) References Cited

U.S. PATENT DOCUMENTS

| 10,257,194 | B2* | 4/2019 | Dabbiere | H04L 63/105 |
| 10,298,577 | B1* | 5/2019 | Aithal | H04L 63/0884 |
| 2011/0083181 | A1* | 4/2011 | Nazarov | H04L 63/14 726/23 |

(Continued)

OTHER PUBLICATIONS

Vault by HashiCorp. Retrieved from https://www.vaultproject.io/. Downloaded Jan. 11, 2018.

(Continued)

*Primary Examiner* — Mohammed Waliullah
(74) *Attorney, Agent, or Firm* — Carlson, Gaskey & Olds, P.C.

(57) ABSTRACT

An example computer-implemented method of providing security for a software container includes discovering credentials that a software container is expected to use at runtime. The discovering is performed prior to instantiation of the software container from a container image, and is based on one or more of credentials stored in the container image, credentials stored in runtime configuration data for the software container, and credentials from a secrets management service. An unsafe credential set is determined that includes one or more of the discovered credentials that do not meet predefined credential safety criteria. A runtime request is intercepted from the software container. A credential violation is detected based on the intercepted runtime request attempting to use a credential from the unsafe discovered credential set. A corrective action is performed for the software container based on the detected credential violation.

34 Claims, 5 Drawing Sheets

(56) References Cited

U.S. PATENT DOCUMENTS

| | | | |
|---|---|---|---|
| 2015/0310205 A1* | 10/2015 | Pruthi | G06F 21/46 726/25 |
| 2018/0039774 A1* | 2/2018 | Dolby | G06F 21/51 |
| 2019/0370456 A1* | 12/2019 | Abbasian | G06F 21/604 |
| 2020/0076792 A1* | 3/2020 | Ray | H04L 63/0815 |

OTHER PUBLICATIONS

Changeme—A Default Credential Scanner. Post sponsored by Faradaysec | Multiuser Pentest Environment. Retrieved from https://www.kitploit.com/2017/10/changeme-default-credential-scanner.html. Downloaded Jan. 11, 2018.

Preempt Inspector: Free Health Check App for Assessing Enterprise Passwords, Stealthy Admins and More. Retrieved from: https://www.preempt.com/preempt-inspector/ Downloaded Jan. 11, 2018.

* cited by examiner

CREDENTIAL SAFETY MANAGEMENT FOR SOFTWARE CONTAINERS

CROSS-REFERENCE TO RELATED APPLICATIONS

This application is a continuation of U.S. application Ser. No. 17/214,214, filed Mar. 26, 2021, which is a continuation of U.S. application Ser. No. 16/128,662, filed Sep. 12, 2018 and issued as U.S. Pat. No. 11,017,074, the disclosures of each of which are incorporated by reference herein in their entirety.

BACKGROUND

This application relates to software containers, and more particularly to credential safety management for software containers.

Virtual machines have gained popularity for a variety of computing tasks. A virtual machine is a software implementation of a physical machine that executes programs like a physical machine. A typical virtual machine includes an entire additional operating system that runs on top of a host operating system, and one or more applications that run within that additional operating system. Virtual machines enable administrators to run several operating system instances at the same time on a single server. A specialized application called a hypervisor manages the virtual machines that run on a given server. Running multiple operating system instances on a single physical machine, however, is resource-intensive.

More recently, software containers are being used as an alternative to running multiple virtual machines. Software containers allow administrators to virtualize a single application, or group of applications, without requiring virtualization of an entire operating system. A software container includes a software application plus dependencies required to run the application bundled into one package. These files are stored in a container image, and a software container is instantiated from the container image at runtime. The dependencies may include libraries, binaries, and/or configuration files, for example. By containerizing the application and its dependencies, differences in operating system distributions and underlying infrastructure are abstracted away, making it easy to migrate an application between various environments (e.g., development, testing, and production).

Multiple software containers can be run in isolation from each other on a single host operating system, which provides an alternative to running multiple virtual machines and their accompanying operating systems on a single server. Because software containers allow an administrator to virtualize a single application without requiring virtualization of an entire operating system, running a given quantity of software containers is less resource intensive than running the same quantity of virtual machines. One platform for building and running software containers is DOCKER.

Software containers may use credentials such as passwords during operation. It is undesirable for a container to use unsafe credentials that can be easily guessed or discovered by a third party.

SUMMARY

An example computer-implemented method of providing security for a software container includes discovering credentials that a software container is expected to use at runtime. The discovering is performed prior to instantiation of the software container from a container image, and is based on one or more of credentials stored in the container image, credentials stored in runtime configuration data for the software container, and credentials from a secrets management service. An unsafe credential set is determined that includes one or more of the discovered credentials that do not meet predefined credential safety criteria. A runtime request is intercepted from the software container. A credential violation is detected based on the intercepted runtime request attempting to use a credential from the unsafe credential set. A corrective action is performed for the software container based on the detected credential violation.

An example credential safety management system includes at least one collector configured to discover credentials that a software container is expected to use at runtime prior to instantiation of the software container from a container image, based on one or more of credentials stored in the container image, credentials stored in runtime configuration data for the software container, and credentials from a secrets management service. The collector is configured to determine an unsafe credential set that includes one or more of the discovered credentials that do not meet predefined credential safety criteria. A runtime service is configured to intercept a runtime request from the software container, detect a credential violation based on the intercepted runtime request attempting to use a credential from the unsafe credential set, and perform a corrective action for the software container based on the detected credential violation.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

DETAILED DESCRIPTION

Figure 1:
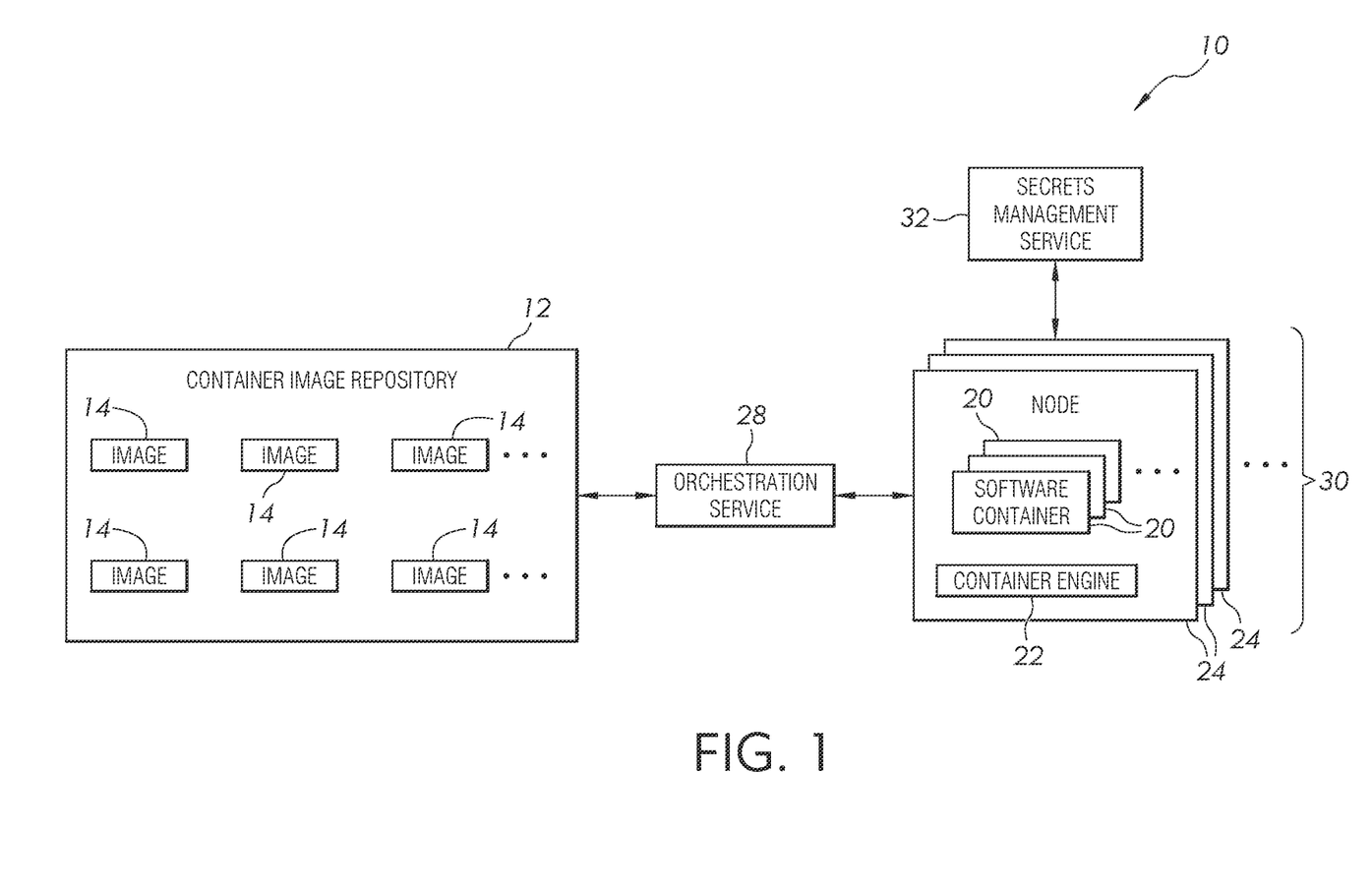
FIG. 1 schematically illustrates an example system for running and managing software containers.

FIG. 1 schematically illustrates an example system 10 for running and managing software containers 20. A container image repository 12 stores a plurality of software container images 14. Each container image 14 includes a plurality of files that can be instantiated as a running software container 20 by a container engine 22. The container engine 22 runs on a host 24 (or "node"), which is one of a plurality of similarly configured hosts 24 that each also include a copy of the container engine 22 and can run software containers 20. The hosts 24 are grouped into a cluster 30.

The container images 14 can include standalone applications, such as services, or can include discrete portions of a larger software application. Such discrete portions are known as "microservices" in some examples. A plurality of microservices can cooperatively operate across multiple software containers 20 on a single host 24 or across multiple hosts 24 that are part of a cluster 30 (e.g., as parts of a larger software application).

Figure 2:
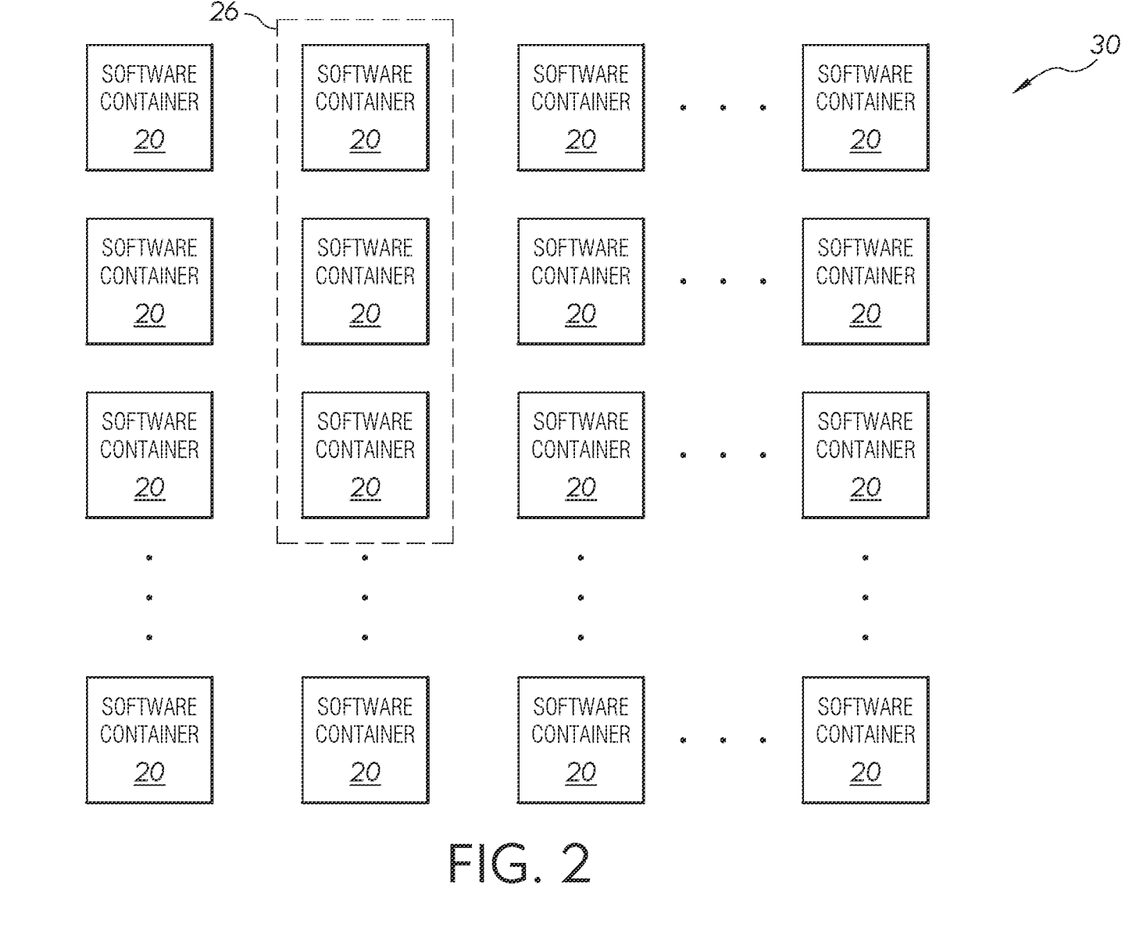
FIG. 2 schematically illustrates a plurality of software containers and a container group.

Multiple ones of the container images 14 may share a same "base image." A base image is a container image 14 that serves as a foundation upon which additional files/layers can be added to create a final container image 14. Thus, a plurality of the container images 14 may originate from a common base image. The software containers 14 can be organized into container groups 26 which indicate some common characteristic amongst the container images 14 (e.g., a shared base image). FIG. 2 illustrates a plurality of software containers 20 in the cluster 30, including a container group 26 that includes three related software containers 20.

An orchestration service 28 handles resource management and scheduling for software containers 20 across the cluster 30 of hosts 24. In one example, the orchestration service 28 schedules when the hosts 24 instantiate the container images 14 as software containers 20, selects which ones of the hosts 24 instantiates a given software container 20, and performs load balancing amongst the hosts 24. As non-limiting examples, some orchestration services that could be used in the system 10 include DOCKER SWARM, KUBERNETES, and MESOSPHERE. In one example, instead of accessing the container image repository 12 directly, the orchestration service 28 accesses the container images 14 stored in the container image repository 12 by commanding the hosts 24 to access the container images 14.

In one example, the container engine 22 is a DOCKER engine. In one example, each host 24 is a rack mounted server of a service provider. Of course, other host 24 arrangements and other containers engines 22 could be used. Although six container image 14, three software containers 20, and three hosts 24 are shown in FIG. 1, it is understood that any number of container images 14, software containers 20, and hosts 24 could be used. Also, in one example the same container image 14 can be instantiated multiple times to provide multiple concurrently running software containers 20 on the same and/or multiple ones of the hosts 24.

The software containers 20 use credentials at runtime for authentication (e.g., of a user or service). In one example, the credentials include secrets, such as passwords, tokens, private keys, etc. In the same or another example, the credentials include something used for secret validation, such as password hashes, certificates, public keys, etc.

Credentials may reside in a variety of locations, such as in a container image 14, in configuration information for a container image 14 (e.g., an environment variable or command line parameter stored by the orchestration service 28), and/or in a secrets management service 32.

The secrets management service 32 is configured to provide credentials to the software containers 20 at runtime. In one example, the secrets management service 32 is able to create credentials dynamically, rotate them, and revoke them.

In one example, the orchestration service 28 is configured to set or modify credentials of some or all of the software container 20 at runtime by using certain values for environment variables, command line arguments, and/or configuration files when it launches a software container 20. Thus, configuration of a software container 20 is not necessarily static within a container image 14, but rather can be dynamically changed based on utilizing the orchestration service 28 and/or secrets management service 32.

It is undesirable for a software container 20 to use unsafe credentials at runtime, because such usage may enable an adversary to obtain the credential and misuse it (e.g., to gain privileged access to sensitive information).

The following is a list of example reasons for why a credential could be deemed "unsafe":

Weakness—the credential is a known default credential, is a weak credential (e.g., a password of "password" or "12345"), or is discoverable through a dictionary attack.

Retrievable—the credential can be retrieved from a container image 14 and is therefore easily discoverable by anyone with access to the base image, or can be retrieved from some other source that is generally accessible to the public (e.g., a public source code repository such as GITHUB).

Reuse/sharing—the credential is used by two different software containers 20 or two different container groups 26 (e.g., the same credential is used by a different software container 20 operating in a different context, (e.g., network, production vs. provisioning, orchestrator project)).

Exhaustion—the credential has been used for longer than a threshold period of time, or is derived from a key that has been used for longer than the threshold period of time (e.g., a trivial modification to an exhausted credential).

Credential safety criteria for determining whether a given credential is safe can be defined based on any one or combination of the items above, for example. The criteria may vary depending on the security requirements of a user and/or organization. For example, more stringent credential safety criteria may be required for software containers or organizations that handle particularly sensitive data.

While use of unsafe credentials may be acceptable in a development or testing environment, use of unsafe credentials is typically considered unacceptable in a production environment. Use of unsafe credentials may be attempted for a variety of reasons, such as developer and/or administrator misconfiguration.

Figure 3:
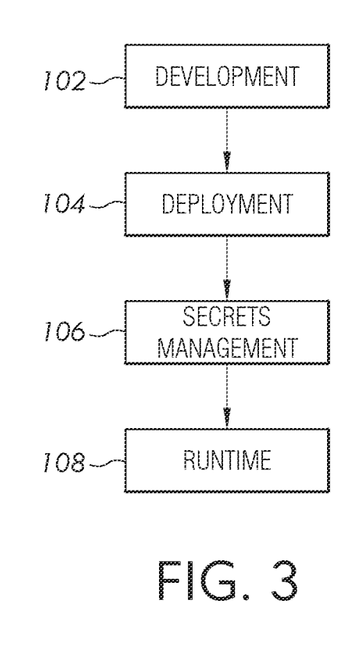
FIG. 3 schematically illustrates a plurality of example lifecycle stages for a software container.

FIG. 3 schematically illustrates a plurality of lifecycle stages for a software container 20, including a development stage 102, a deployment stage 104, a secrets management stage 106, and a runtime stage 108. Each of these stages poses a threat of using unsafe credentials. These four stages 102-108, along with example credential issues that can arise in each stage, are discussed below.

In one example of the development stage 102, a container image 14 is created from a base image that contains default credentials. The default credentials are discoverable by anyone with access to the base image. In some instances, the inclusion of credentials in a container image 14, no matter how unique the credentials, is deemed unsafe. In some instances, inclusion of credentials in a container image 14 is acceptable, but only if those default credentials are not used at runtime. While unsecure testing may be acceptable during development and/or testing, it may be considered hazardous in a production environment. A developer may have accidentally included credentials in their container image 14 and not be aware that the credentials are still stored in the container image 14.

In one example of the deployment stage 104, the orchestrator service 28 deploys a container image 14 to one or more of the hosts 24 for instantiation as one or more software containers 20 for either testing or production. If the configuration data for the container image 14 at the orchestration service 28 is faulty (e.g., an environment variable name is misspelled), a production version of the software container 20 may revert to using a default credential and/or may end up using credential that was only meant for use during testing.

In one example of the secrets management stage 106, the secrets management service 32 makes credentials available to a software container 20 based on its configuration. In one example, the secrets management service 32 provides credentials to the container engine 22, and the container engine 22 pushes the credentials out to the software container 20 at startup using either environment variables or file(s) with a secret value mounted into the software container 20. If configured properly, use of the secrets management service 32 should provide for safe credentials. However, if a secret is injected to a wrong location (e.g., a wrong environment variable name), a software container 20 may be unable to find the credential and may revert to using a default credential.

In one example of the runtime stage 108, a credential is loaded by an application in a software container 20. Even if all of the configuration of the application in the software container 20 is done correctly with the orchestration service 28 and secrets management service 32, runtime behavior of the application may end up overriding safe credentials with unsafe default credentials. This could occur, for example, if a software container 20 uses an API (e.g., with credentials other than those that are being requested from the secrets management service 32) to obtain a secret, but the secret management service 32 is down, causing the software container 20 to revert to default credentials.

As these examples demonstrate, it is very difficult to determine whether safe credentials will actually be used at runtime. The stages 102-108 are rife with opportunities for unsafe credential usage, despite the good intentions of a developer who creates a container image 14, or an administrator who configures the orchestration service 28 and/or secrets management service 32 for the software container 20 corresponding to the container image 14. Unsafe credential issues can continually resurface due to bad orchestrator configurations, for example.

Figure 4:
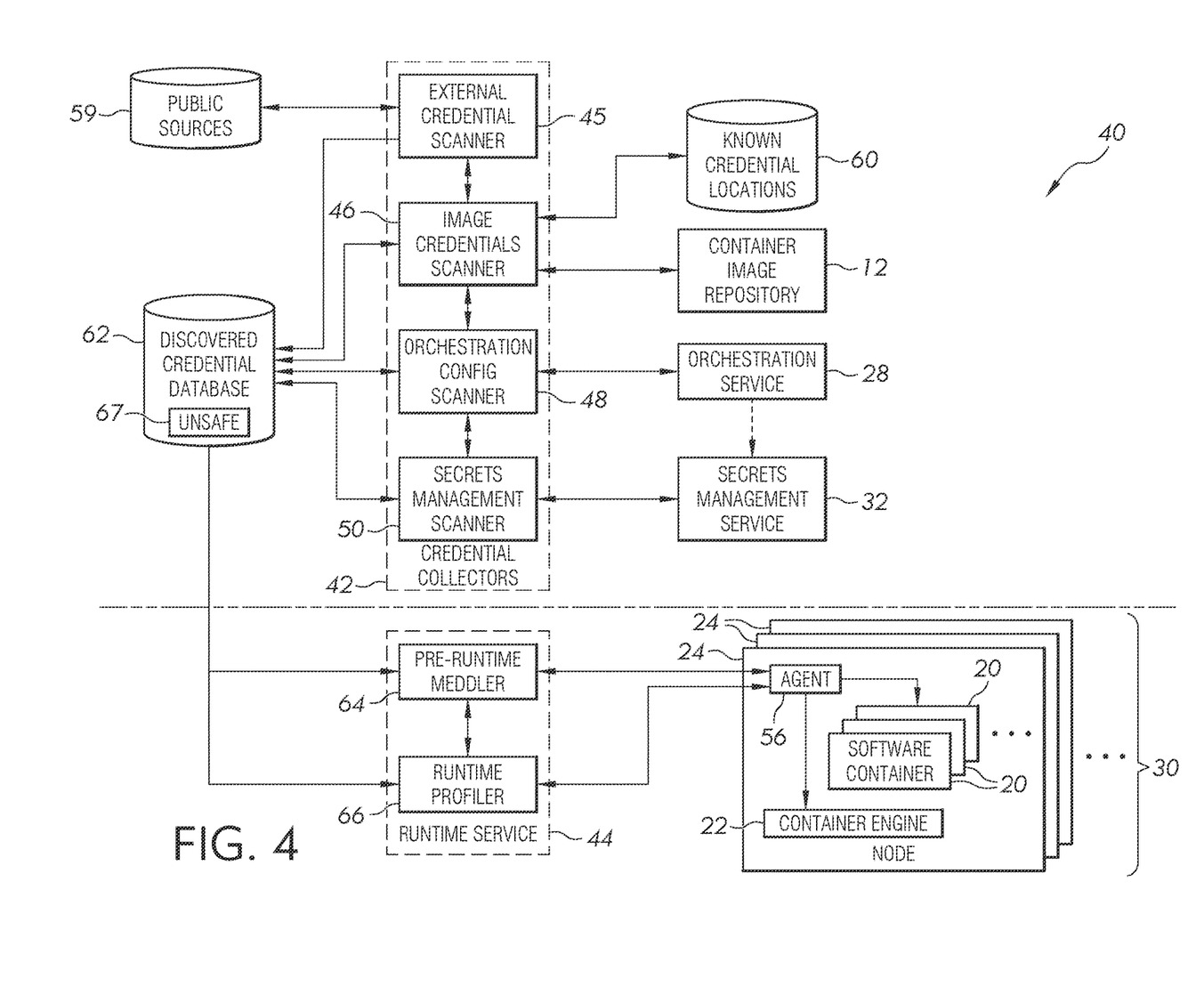
FIG. 4 schematically illustrates an example system for providing credential safety management.

FIG. 4 schematically illustrates a system 40 for providing credential safety management for a plurality of software containers 20. The system 40 utilizes credential collectors 42 which gather discovered credentials for a software container 20 prior to runtime of the software container 20 based on scanning a plurality of sources. The system 40 also includes a runtime service 44 that compares credentials gathered by the credential collectors 42 against credentials the software container 20 attempts to use at runtime, and applies a mitigation if unsafe credential use is attempted. The mitigation is a corrective action, and it can be dependent on the software application at issue and a user configuration, for example.

The credential collectors 42 discover credentials that a software container 20 is expected to use at runtime based on one or more of credentials stored in an associated container image 14 for the software container 20, credentials stored in runtime configuration data for the software container 20, and credentials from the secrets management service 32. The credential collectors 42 include an external credential scanner 45, an image credentials scanner 46, an orchestration configuration scanner 48, and a secrets management scanner 50.

The external credential scanner 45 scans public sources 59 (e.g., public source code repositories such as GITHUB) to determine credentials that are available to the public from third party locations. In one example, these credentials are considered unsafe.

The image credential scanner 46 performs pre-runtime scanning of container images 14 stored in the container image repository 12. In one example, the pre-runtime scanning includes looking in expected credential storage locations within each of the container images 14. In one example, this includes determining a particular software application stored in the container image 14, and determining the expected credential storage location based on that particular application (e.g., based on a database 60 that stores known credential locations for certain software applications).

Any credentials discovered by the image credentials scanner 46 are considered discovered credentials that are expected to be used at runtime, and are stored in a discovered credential database 62 with an indication of the container image 14 in which they were discovered. In one example, a discovered credential is salted and/or hashed prior to being stored in the discovered credential database 62 to provide additional security, and to limit the usefulness of the credentials to a hacker that may obtain them through unauthorized means.

In addition to storing credentials from the credential collectors 42, in one example the discovered credential database 62 also stores an indication of whether the stored credentials are considered unsafe. A gathered credential could be considered unsafe for any of the following reasons, for example:
  the credential is vulnerable to dictionary attacks,
  the credential was discovered by the external credential scanner 45, and
  the credential is exhausted through use for longer than a predefined time period, or is derived from an exhausted credential (e.g., include a trivial modification of an exhausted credential).

In one example, the discovered credential database 62 also stores credential group information that identifies one or more container groups 26 to which a given software container 20 belongs. Container groups 26 can be defined in a variety of different ways, including, but not limited to, any of the following:
  Similarity and/or related functionality—grouping based on similarity between container images and/or related functionality, such as
    grouping based on a shared base image
    grouping based on a same application type (e.g., web server)
    grouping based on a same application (e.g., APACHE)
    grouping based on related microservices that are part of a same larger application.
  Orchestration Configuration
    grouping based on container images 14 sharing the same labels and/or tags (e.g., a tag indicating "back end" for back end applications)
    grouping based on container images 14 sharing the same namespace(s)
    logical grouping (e.g., pods as named in some orchestrators).
  Runtime Attributes
    grouping based on the host 24 that a software container 20 is deployed on
    grouping based on hardware architecture (e.g., if a software container 20 is built to run on specific hardware).

The orchestration configuration scanner 48 extracts data about the software containers 20 from the orchestration service 28, and uses that extracted data as a basis for identifying which credentials are likely to be affected during runtime. The extracted data can include data such as the base image of a software container 20, command line arguments and/or environment variables of a software container 20, mounted volumes and files that will be used at runtime by the software container 20, tags and/or labels of a container image 14, secrets accessible to a software container 20, configuration files for a container image 14, etc. This information can be used for determining a container group 26 and for obtaining credentials.

The orchestration configuration scanner 48 uses command line arguments and/or environment variable information obtained from the orchestration service 28 and cross-references that against data collected by the image credentials scanner 46 to identify which credentials could be affected during runtime. In this regard, an environment variable, command line argument, and/or configuration file could serve as a "modifier" that modifies a discovered credential at runtime (e.g., based on a value defined in the orchestration service 28 or the secrets management service 32). As an example, an environment variable can be specified for use at runtime as a password, and that could change what credentials are used—default ones or otherwise—by changing a discovered default credential in the discovered credential database 62.

The orchestration configuration scanner 48 also queries the discovered credentials database 62 to determine if other software containers 20 and/or container groups 26 are expected to use the same credentials. Data from the orchestration configuration scanner 48 can be stored in the discovered credential database 62.

The secrets management scanner 50 identifies which credentials will be obtained from the secrets management service 32 at runtime. In one example, the secrets management scanner 50 obtains salted and/or hashed versions of credentials that are to be used at runtime by the software containers 20 and compares those salted and/or hashed credentials against salted and/or hashed credentials stored in the discovered credential database 62.

Each container image 14 includes configuration data such as an indication of which environment variable(s) are expected to be defined at runtime. The orchestration service 28 also includes configuration data for runtime of a software container 20, such as which image to use, which environment variables to use, which values to apply to those environment variables, etc.

Secrets can be introduced to a software container 20 in a variety of ways, such as through an environment variable or through a file mounted in the software container 20. In one example, the secrets management scanner 50 determines configuration data for the particular container image 14 from the orchestration configuration scanner 48 (e.g., what environment variable(s) are expected to be defined), and queries the secrets management service 32 to determine how values, such as the environment variable(s), will be set at runtime. In one such example, the secrets management scanner 50 identifies that the secrets management service 32 will be used based on an environment variable of a particular container image 14 being set equal to an object from inside the secrets management service 32. In one example, the secrets management scanner 50 scans one or more files that will be mounted within a software container 20 to determine a secret of the software container 20.

The output of the orchestration configuration scanner 48 and secrets management scanner 50 can likewise be stored in the discovered credential database 62.

The runtime service 44 includes a pre-runtime meddler 64 and a runtime profiler 66. The pre-runtime meddler 64 determines what credentials are likely to be used at runtime based on all of the discovered credentials associated with a given software container 20 from the discovered credential database 62, as obtained by the credential collectors 42. The pre-runtime meddler 64 analyzes those credentials to determine whether they comport with predefined credential safety criteria. If any of the credentials do not comport with the predefined credential safety criteria, they are added to an unsafe credential set 67 that includes one or more of the discovered credentials that do not meet predefined credential safety criteria for a particular software container 20.

The unsafe credential set 67 may be unique to a particular software container 20, because credentials that are considered unsafe for one software container 20 may not be considered unsafe for another software container image 20. Also, it is understood that in some examples there is no correlation between the credentials in the unsafe credential set 67 other than that they are predicted for use by a given software container 20 and are considered unsafe for that software container 20. Credentials can be added to the unsafe credential set 67 by the credential collectors 42 or the runtime service 44.

As discussed above, a variety of different credential safety criteria can be used. In one example, the credential safety criteria indicates that a discovered credential is unsafe if it is present in a container image 14, is vulnerable to a dictionary attack, or is available on an open source source-code repository. In one example, the credential safety criteria indicates that a credential is unsafe if it is predicted to be used by software containers 20 from different container groups 26. If a credential is used by other container groups 26, that is a good indicator that the credential in question is a default credential and therefore not suitable for production use. In one example, the credential safety criteria indicates that a credential is unsafe if it is used by any other container image 14.

The pre-runtime meddler 64 also determines possible changes to credentials from the discovered credentials database 62 that can be deduced by the parameters given to the container engine 22 (e.g., command line parameters, mounted files, environment variables, entrypoint, etc.—as read from the orchestration service 28). The pre-runtime meddler 64 is able to predict, with a high degree of probability, which credentials a given software container 20 will use at runtime.

In one example, the pre-runtime meddler 64 determines whether the runtime credentials (e.g., from the orchestration service 28 and/or secrets management service 32) are the same as credentials collected by the image credentials scanner 46, and if so those runtime credentials are added to the unsafe credential set 67 for the particular container image 14.

In one example, the pre-runtime meddler 64 determines whether credentials stored in the discovered credential database 62 for a given container image 14 are the same as credentials used by another container group 26, and if so those credentials are likely default credentials and are added to the unsafe credential set 67 for the particular software container 20.

In one example, the pre-runtime meddler 64 determines whether the runtime credentials are different from the credentials provided by the secrets management scanner 50, in which case they may indicate a reversion to default credentials which is unsafe.

The runtime profiler 66 performs the same or a similar function to the pre-runtime meddler 64 except that it relies on actual runtime information after a software container 20 is already running, as collected by an agent 56. In one example, the runtime profiler 66 verifies the predictions of the pre-runtime meddler 64 based on actual runtime conditions.

At runtime, the container engine 22 on a given host 24 instantiates a particular one of the container images 14 as a software container 20. The agent 56 on the host 24 monitors and interacts with the container engine 22 and the running software container 20. The agent 56 can extract information from the software container 20 such as its base image, supplied parameters, given environment variables, variables created during runtime, mounted volumes, accessed files and volumes, etc.

The agent 56 intercepts a runtime request from the software container 20 instantiated from one of the container images 14. The agent 56 communicates with the runtime service 44 to determine if the intercepted runtime request is attempting to use a credential from the unsafe credential set 67.

If the runtime profiler 66 detects such a credential violation, a corrective action is performed, optionally in conjunction with the agent 56. In one example, the corrective action includes substituting an unsafe credential that the software container 20 is attempting to use with a safe credential, such as one obtained from the secrets management service 32. Another example corrective action includes preventing the intercepted request from executing. Another example corrective action includes providing an alert that the software container 20 is attempting to use an unsafe credential to a user and/or to a log file, for example. In one example, the use of a substitute credential corresponds to a virtual patch.

Figure 5:
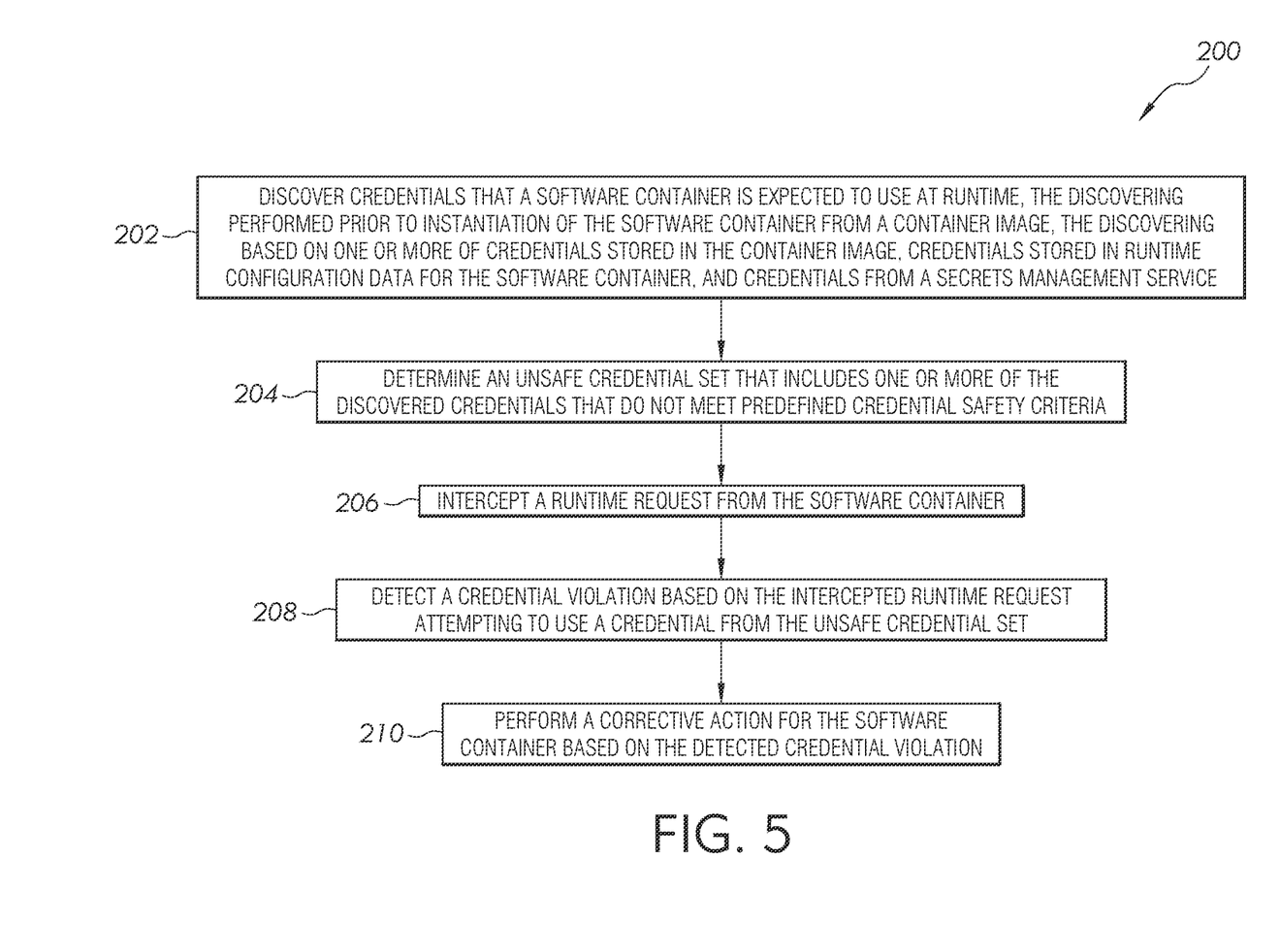
FIG. 5 schematically illustrates an example method of providing security for a software container.

FIG. 5 is a flowchart representative of an example method 200 of providing security for a software container. A discovery is made of credentials that a software container 20 is expected to use at runtime (block 202). The discovery of block 202 is performed prior to instantiation of the software container 20 from a container image 14, and the discovery is based on one or more of credentials stored in the container image 14, credentials stored in runtime configuration data for the software container, and credentials from a secrets management service 32 for the software container. An unsafe credential set 67 is determined that includes one or more of the discovered credentials that do not meet predefined credential safety criteria (block 204). A runtime request is intercepted from the software container 20 (block 206). A credential violation is detected based on the intercepted runtime request attempting to use a credential from the unsafe credential set 67 (block 208). A corrective action is performed for the software container based on the detected credential violation (block 210).

Figure 6:
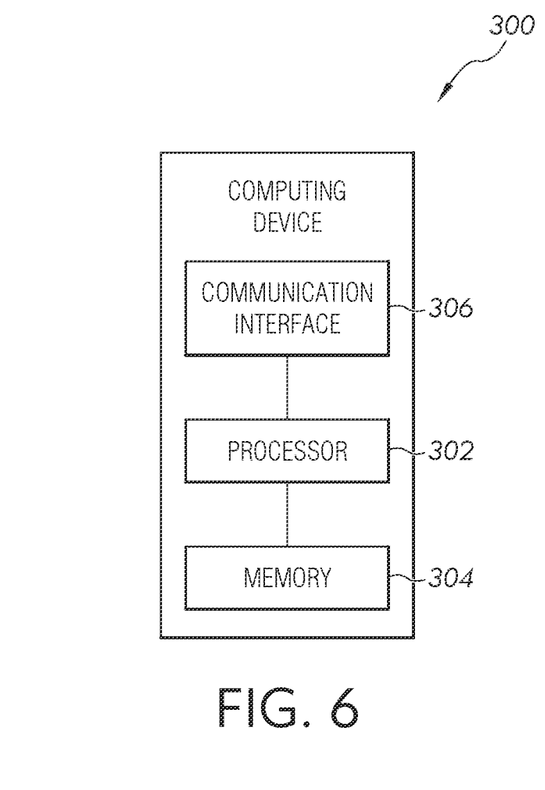
FIG. 6 schematically illustrates an example computing device.

FIG. 6 schematically illustrates an example computing device 300 that may be utilized to implement one or more of the credential collectors 42 and runtime services 44, and/or perform some or all of the method 200. The computing device 300 includes a processor 302 that is operatively connected to memory 304 and a communication interface 306.

The processor 302 includes processing circuitry to perform one or more of the steps of method 200. The processor 302 may include one or more microprocessors, microcontrollers, application specific integrated circuits (ASICs), or the like, for example.

The memory 304 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 304 may incorporate electronic, magnetic, optical, and/or other types of storage media. The memory 304 can also have a distributed architecture, where various components are situated remotely from one another, but can be accessed by the processor 302. In one example, the memory 304 stores the discovered credential database 62.

The communication interface 306 is configured to facilitate communication with other computing devices (e.g., between the computing device 300 and the hosts 24 of cluster 30).

The system described herein can be configured to provide a fully automated solution, and can be configured to integrate with existing processes/pipelines, such as an existing orchestration service 28 and/or existing secrets management service 32. In one aspect, the system 40 described above does not require additional authentication to running containers because the agent 56 is already configured for such access.

By knowing which software containers 20 are using which credentials, the system 40 is able to discover configuration mistakes which may otherwise cause a software container 20 to attempt to use an unsafe credential, and can further detect whether a configured injection of credentials into a software container 20 at runtime will cause the software container 20 to use an unsafe credential.

Although a number of example embodiments have been disclosed, a worker of ordinary skill in this art would recognize that certain modifications would come within the scope of this disclosure. For that reason, the following claims should be studied to determine the true scope and content of this disclosure.

What is claimed is:

1. A computer-implemented method of providing security for a software container, comprising:
   discovering credentials that a software container is expected to use at runtime, the discovering performed prior to instantiation of the software container from a container image, the discovering based on one or more of credentials stored in the container image, credentials stored in runtime configuration data for the software container, and credentials from a secrets management service;
   determining an unsafe credential set that includes one or more of the discovered credentials that do not meet predefined credential safety criteria;
   intercepting a runtime request from the software container during runtime of a software application in the software container;
   detecting a credential violation based on the intercepted runtime request attempting to use a credential from the unsafe credential set; and
   performing a corrective action for the software container based on the detected credential violation.

2. The computer-implemented method of claim 1, wherein said discovering credentials comprises performing pre-runtime scanning for credentials in expected credential storage locations of the container image.

3. The computer-implemented method of claim 1, wherein:

said discovering is based on credentials stored in runtime configuration data for the software container; and said discovering credentials comprises querying a container orchestrator for credentials stored in the runtime configuration data, wherein the container orchestrator is configured to control resource management for a plurality of host computing devices that are configured to run the software container and a plurality of additional software containers.

4. The computer-implemented method of claim 1, wherein:

said discovering is based on credentials from a secrets management service; and said discovering credentials comprises querying the secrets management service for credentials for the container image, wherein the secrets management service is configured to provide credentials for a plurality of container images.

5. The computer-implemented method of claim 1, comprising storing the discovered credentials in a discovered credential repository along with an identifier of the container image to which they correspond, wherein the discovered credential repository is separate from the container image.

6. The computer-implemented method of claim 5, comprising salting the discovered credentials, hashing the discovered credentials, or both, prior to storing the discovered credentials in the discovered credential repository.

7. The computer-implemented method of claim 1, wherein the predefined credential safety criteria indicates that a credential is unsafe if the credential has been in use for longer than a predefined allowable usage period, or is derived from a credential that has been in use for longer than the predefined allowable usage period.

8. The computer-implemented method of claim 1, wherein the predefined credential safety criteria indicates that a credential is unsafe if the credential is stored in the container image.

9. The computer-implemented method of claim 1, wherein the predefined credential safety criteria indicates that a credential is unsafe if the credential is discoverable through a dictionary attack.

10. The computer-implemented method of claim 1, wherein the predefined credential safety criteria indicates that a credential is unsafe if the credential is stored in a publicly-accessible source code repository.

11. The computer-implemented method of claim 1, wherein the predefined credential safety criteria indicates that a credential is unsafe if the credential is not obtained from the secrets management service for the software container.

12. The computer-implemented method of claim 1, wherein said performing a corrective action based on the detected credential violation comprises preventing execution of the intercepted runtime request.

13. The computer-implemented method of claim 1, wherein said performing a corrective action based on the detected credential violation comprises substituting the credential from the unsafe credential set with a safe credential, and executing the intercepted runtime request with the safe credential.

14. The computer-implemented method of claim 13, wherein said substituting the credential comprises dynamically obtaining a credential for the software container from the secrets management service, and utilizing the credential from the secrets management service as the safe credential.

15. The computer-implemented method of claim 1, wherein said performing a corrective action based on the detected credential violation comprises providing an alert that the software container is attempting to use an unsafe credential.

16. The computer-implemented method of claim 1, wherein the predefined credential safety criteria is based on at least two of credential strength, credential retrievability, credential reuse, or credential exhaustion.

17. A credential safety management system comprising:
processing circuitry operatively connected to memory and configured to:
discover credentials that a software container is expected to use at runtime prior to instantiation of the software container from a container image, the discovery based on one or more of credentials stored in the container image, credentials stored in runtime configuration data for the software container, and credentials from a secrets management service; and
determine an unsafe credential set that includes one or more of the discovered credentials that do not meet predefined credential safety criteria; and
a runtime service configured to:
intercept a runtime request from the software container during runtime of a software application in the software container;
detect a credential violation based on the intercepted runtime request attempting to use a credential from the unsafe credential set; and
perform a corrective action for the software container based on the detected credential violation.

18. The credential safety management system of claim 17, wherein to discover the credentials, the processing circuitry is configured to perform pre-runtime scanning for credentials in expected credential storage locations of the container image.

19. The credential safety management system of claim 17, wherein:

the discovery is based on credentials stored in runtime configuration data for the software container; and to discover the credentials, the processing circuitry is configured to query a container orchestrator for credentials stored in the runtime configuration data, wherein the container orchestrator is configured to control resource management for a plurality of host computing devices that are configured to run the software container and a plurality of additional software containers.

20. The credential safety management system of claim 17, wherein:

the discovery is based on credentials from a secrets management service; and to discover the credentials, the processing circuitry is configured to query the secrets management service for credentials for the container image, wherein the secrets management service is configured to provide credentials for a plurality of container images.

21. The credential safety management system of claim 17, wherein the processing circuitry is configured to store the discovered credentials in a discovered credential repository along with an identifier of the container image to which they correspond, wherein the discovered credential repository is separate from the container image.

22. The credential safety management system of claim 21, wherein:

to store the discovered credentials in the discovered credential repository, the processing circuitry is configured to store identifiers of modifiers that can modify the discovered credentials at runtime, the modifiers including one or more of environment variables, command line arguments, and configuration files; and to detect a credential violation based on the intercepted runtime request attempting to use a credential from the unsafe credential set, the processing circuitry is configured to detect that the intercepted runtime request is attempting to utilize a modified credential that is modified by one of the modifiers and does not meet the predefined credential safety criteria.

23. The credential safety management system of claim 21, wherein the processing circuitry is configured to salt the discovered credentials, hash the discovered credentials, or both, prior to storing the discovered credentials in the discovered credential repository.

24. The credential safety management system of claim 21, wherein:
- the processing circuitry is configured to determine whether a discovered credential is unsafe based on whether the discovered credential is stored in the discovered credential repository for one or more other software containers;
- the processing circuitry is configured to determine that the software container is part of a container group of related software containers; and
- the predefined credential safety criteria indicates that a credential is unsafe if it is stored in the discovered credential repository and is associated with multiple container groups.

25. The credential safety management system of claim 17, wherein the predefined credential safety criteria indicates that a credential is unsafe if the credential has been in use for longer than a predefined allowable usage period, or is derived from a credential that has been in use for longer than the predefined allowable usage period.

26. The credential safety management system of claim 17, wherein the predefined credential safety criteria indicates that a credential is unsafe if the credential is stored in the container image.

27. The credential safety management system of claim 17, wherein the predefined credential safety criteria indicates that a credential is unsafe if the credential is discoverable through a dictionary attack.

28. The credential safety management system of claim 17, wherein the predefined credential safety criteria indicates that a credential is unsafe if the credential is stored in a publicly-accessible source code repository.

29. The credential safety management system of claim 17, wherein the predefined credential safety criteria indicates that a credential is unsafe if the credential is not obtained from the secrets management service for the software container.

30. The credential safety management system of claim 17, wherein said performing a corrective action based on the detected credential violation comprises preventing execution of the intercepted runtime request.

31. The credential safety management system of claim 17, wherein to perform a corrective action based on the detected credential violation, the processing circuitry is configured to substitute the credential from the unsafe credential set with a safe credential, and execute the intercepted runtime request with the safe credential.

32. The credential safety management system of claim 31, wherein to substitute the credential, the processing circuitry is configured to dynamically obtain a credential for the software container from the secrets management service, and utilize the credential from the secrets management service as the safe credential.

33. The credential safety management system of claim 17, wherein to perform a corrective action based on the detected credential violation, the processing circuitry is configured to provide an alert that the software container is attempting to use an unsafe credential.

34. The credential safety management system of claim 17, wherein the predefined credential safety criteria is based on at least two of credential strength, credential retrievability, credential reuse, or credential exhaustion.

* * * * *